(12) United States Patent
Treusch et al.

(10) Patent No.: US 6,708,670 B2
(45) Date of Patent: Mar. 23, 2004

(54) TUBULAR FUEL PRESSURE DAMPER MOUNTING METHOD

(75) Inventors: Christopher Treusch, St. Claire Shores, MI (US); Michael Anthony Adcock, Willis, MI (US); Paul Joseph Vlahakis, Ann Arbor, MI (US); Robert Eugene Wattleworth, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 90 days.

(21) Appl. No.: 10/026,018

(22) Filed: Dec. 21, 2001

(65) Prior Publication Data

US 2003/0084878 A1 May 8, 2003

Related U.S. Application Data

(60) Provisional application No. 60/337,400, filed on Nov. 2, 2001.

(51) Int. Cl.⁷ ............................................... F02M 33/04
(52) U.S. Cl. ........................... 123/456; 138/30; 123/467
(58) Field of Search .................................. 123/456, 468, 123/469, 467; 138/20–30

(56) References Cited

U.S. PATENT DOCUMENTS

| | | | | |
|---|---|---|---|---|
| 4,651,781 A | * | 3/1987 | Kandelman | 138/30 |
| 5,617,827 A | * | 4/1997 | Eshleman et al. | 123/456 |
| 6,205,979 B1 | * | 3/2001 | Sims, Jr. et al. | 123/456 |
| 6,314,942 B1 | * | 11/2001 | Kilgore et al. | 123/467 |
| 6,390,131 B1 | * | 5/2002 | Kilgore | 138/30 |
| 6,418,909 B2 | * | 7/2002 | Rossi et al. | 123/456 |
| 6,463,911 B1 | * | 10/2002 | Treusch et al. | 123/467 |

* cited by examiner

Primary Examiner—Thomas N. Moulis
(74) Attorney, Agent, or Firm—John E. Kajander

(57) ABSTRACT

A method of securing fuel rail dampers within a fuel rail using clips and fingers that engage the damper and rail surfaces while providing substantially no motion between the rail and the damper assembly.

14 Claims, 6 Drawing Sheets

TUBULAR FUEL PRESSURE DAMPER MOUNTING METHOD

This application claims the benefit of Provisional Application No. 60/337,400 filed Nov. 2, 2001.

FIELD OF THE INVENTION

The present invention relates generally to fuel rails for the fuel system of an internal combustion engine, and more particularly to dampers located within the fuel rails.

DISCLOSURE INFORMATION

A fuel rail supplies fuel to fuel injectors, which in turn inject fuel into combustion cylinders in internal combustion engines. Typically, each fuel injector injects fuel in pulses that are controlled to maximize the efficiency of the combustion process within the cylinder. These pulses of injected fuel introduce pressure fluctuations into the fuel contained within the fuel rail. These pressure fluctuations create various problems, including improper fuel distribution to the injectors, which results in inefficient engine operation, and fuel line hammering, which results in vibration and noise.

Fuel rail dampers are employed to dampen the pressure fluctuations within the fuel rail. One type of fuel damper is situated completely within the fuel rail and consists of a sealed chamber which is designed to be tuned to substantially dampen the pressure fluctuations within the fuel rail. Prior art relies on various methods of mounting this pressure damper within the fuel rail.

U.S. Pat. No. 5,617,827 discloses a damper positioned and held within the damper using two damper supports. One of the supports is keyed and corresponds to a positioner in the circumference of the fuel rail to prevent rotation of the damper. These support structures do not allow relative motion between the damper assembly and the fuel rail but are often difficult and expensive to make due to the intricate slots, grooves and keys required to receive the damper and maintain proper positioning.

U.S. Pat. No. 6,205,979 uses two springs at each end of the damper assembly to suspend the damper within the fuel rail. These springs are crimped inside a tube. The crimp which retains the spring also serves to seal the damper chamber from fuel. Especially in high production volumes, it is difficult to insure that this crimp provides a seal sufficient to keep fuel out of the inside of the damper chamber. Furthermore this system suspends the damper assembly within the fuel rail on two sprung mounts, allowing relative movement of the damper assembly with respect to the fuel rail in response to fuel pulsations, engine vibrations or other accelerations. This springing motion within the rail can cause undesirable contact between the damper assembly and features within the fuel rail (such as fuel injector ports), causing wear, noise and the production of metal shavings and fragments which can clog injector ports.

It would be desirable, therefore, to provide a mounting system for fuel dampers with a fuel rail which reduces relative motion between the rail and the damper assembly yet which are easy to produce and assemble.

SUMMARY OF THE INVENTION

The present invention overcomes the disadvantages of the prior art approaches by providing a fuel rail assembly comprising a fuel rail and a damping assembly contained within said fuel rail. The damping assembly is comprised of a damping chamber having a first end, a second end, and a hollow member. The first end and the second end each are formed by crimping the hollow member in a manner such that the cross-sectional outline of the first end and the second end does not extend beyond the cross-sectional outline of the hollow member. The damping assembly further comprises at least one clip fixed in relation to either the first end or the second end. The clip has at least one finger, which contacts the inner wall of the fuel rail. The finger or fingers are disposed on a first side of the damping assembly and the second side of the damping assembly is forced into contact with the inner surface of the fuel rail opposite of where the finger or fingers are in contact with the inner surface of the fuel rail.

A single clip at one end of the damper can be used or clips at each end of the damper assembly can be used. These clips can be attached to the fuel rail by crimping, clipping, adhesive bonding or riveting.

The fuel rail may have structural features which cooperate with the finger or fingers to lock the damper into place longitudinally and/or rotationally within the fuel rail.

The finger or fingers may be designed so that they are plastically deformed to contact the inner surface of the fuel rail once the damper assembly is inserted into the fuel rail.

It is an object and advantage that the present invention substantially maintain the relative position of the damper assembly within the fuel rail in an effective and cost efficient manner.

These and other advantages, features and objects of the invention will become apparent from the drawings, detailed description and claims which follow.

DESCRIPTION OF THE PREFERRED EMBODIMENT(S)

Figure 1:
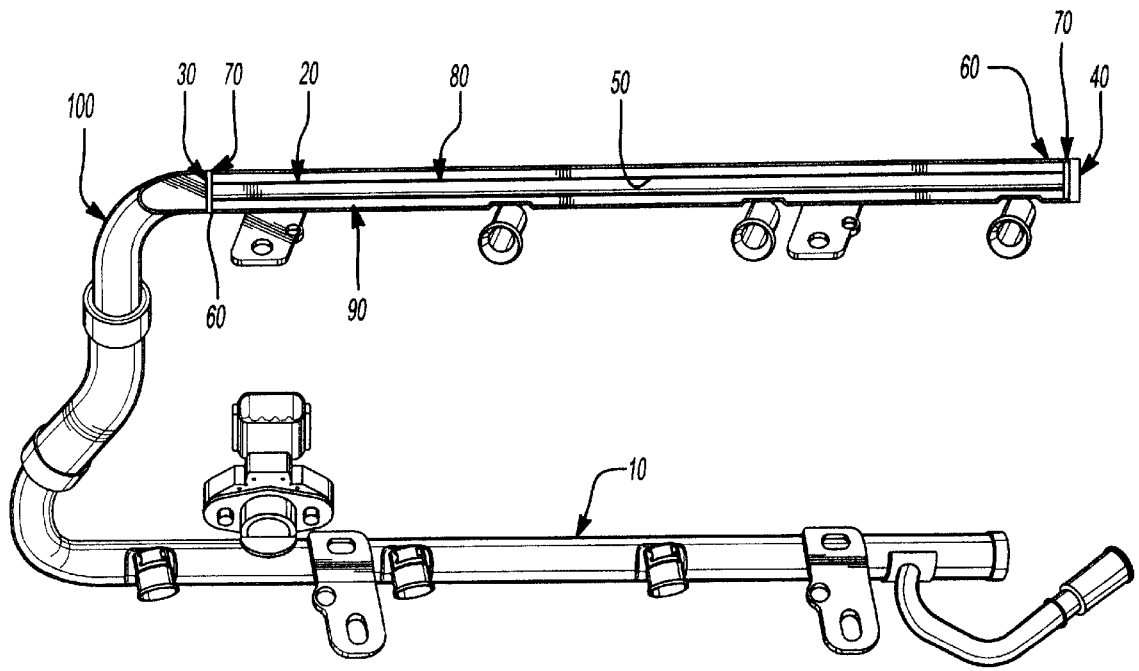
FIG. 1 is an illustration showing the placement of a fuel rail damper assembly within a fuel rail.

Referring now to the drawings, FIG. 1 shows a fuel rail assembly comprising a fuel rail 10 and a damping assembly 20 contained within said fuel rail 10. The damping assembly is comprised of a damping chamber having a first end 30, a second end 40, and an intermediate hollow member 50. A single clip 60 can be used or one may attach a clip 60 at both the first end 30 and the second end 40 of the damper assembly 20. These clips 60 can be attached to the damper assembly 20 by crimping, clipping, adhesive bonding or riveting. The fuel rail 10 may have existing conventional features, such as a radius 100, which cooperate with the finger or fingers 70 to lock the damper 20 into place within the fuel rail 10. Also, fuel rail features may be incorporated which are dedicated solely to cooperating with the finger or fingers to lock the damper into place within the fuel rail, such as ridges, bumps, indents or notches, which may further extend into the inner diameter of the fuel rail or outside of the outer diameter of the fuel rail.

Figure 2:
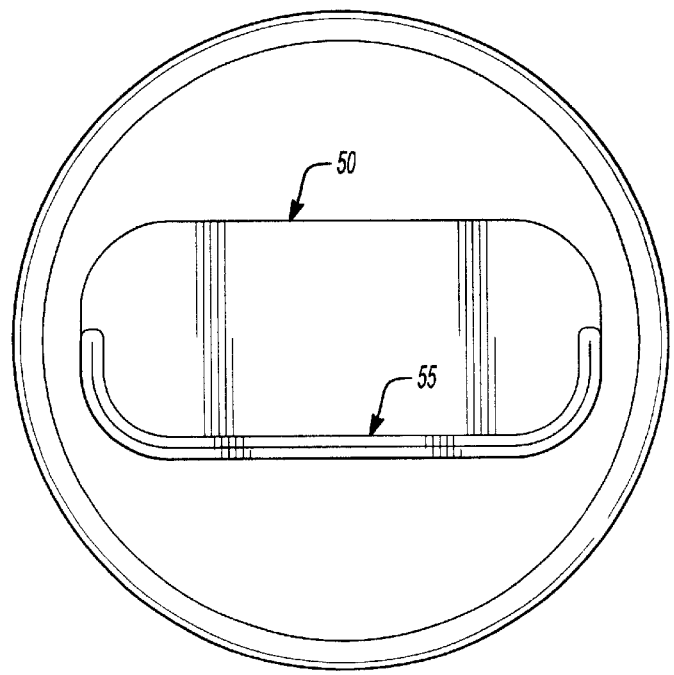
FIG. 2 illustrates a cross sectional view of a fuel rail with a crimped damping chamber in place.

FIG. 2 shows the end view of either a first end or a second end of a damper assembly. Each end is preferably formed by crimping the hollow member 50 in a manner such that the cross-sectional outline of the end 55 does not extend beyond the cross-sectional outline of the hollow member 50.

Figure 3:
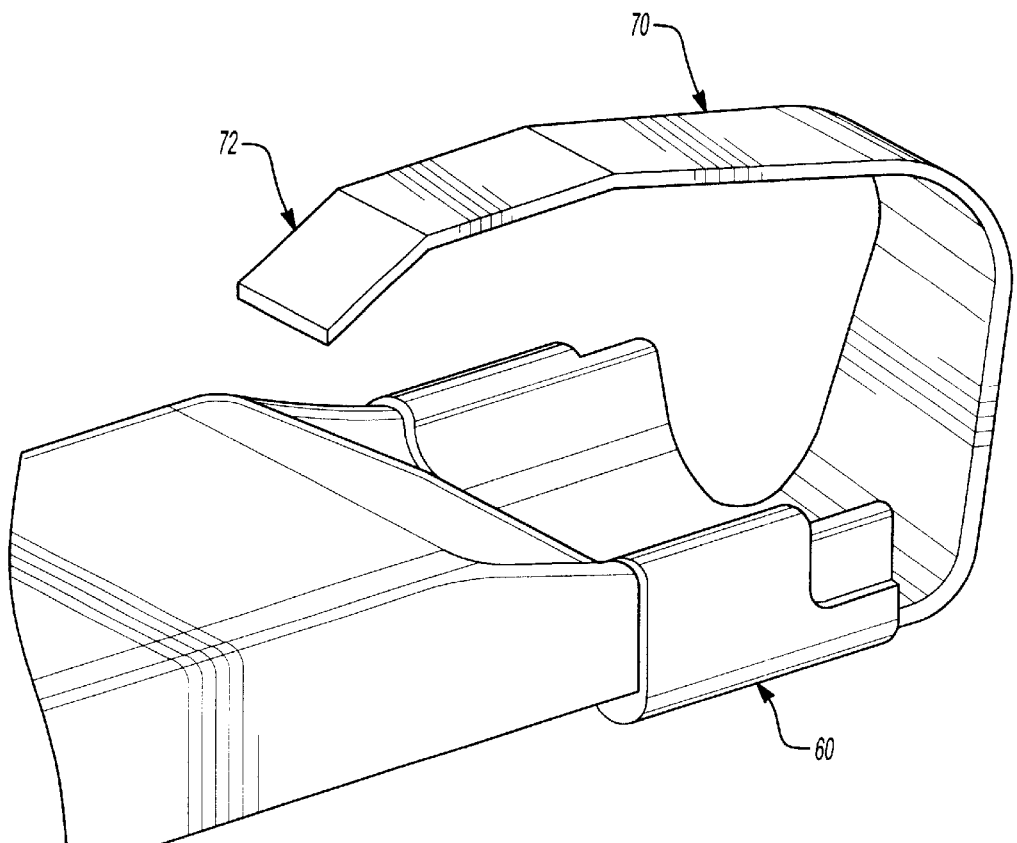
FIG. 3 illustrates a clip attached to a fuel damper.

FIG. 3 shows a perspective view of an end of a damping assembly. The damping assembly is further comprised of at least one clip 60 fixed in relation to either the first end 30 or the second end 40. The clip 60 has at least one finger 70, which contacts the inner wall of the fuel rail 10. Note how this damper has a flat surface 72 at its end designed to interact with a feature on the damper assembly and thus allow for plastic deformation in the clip when inserted.

Figure 4:
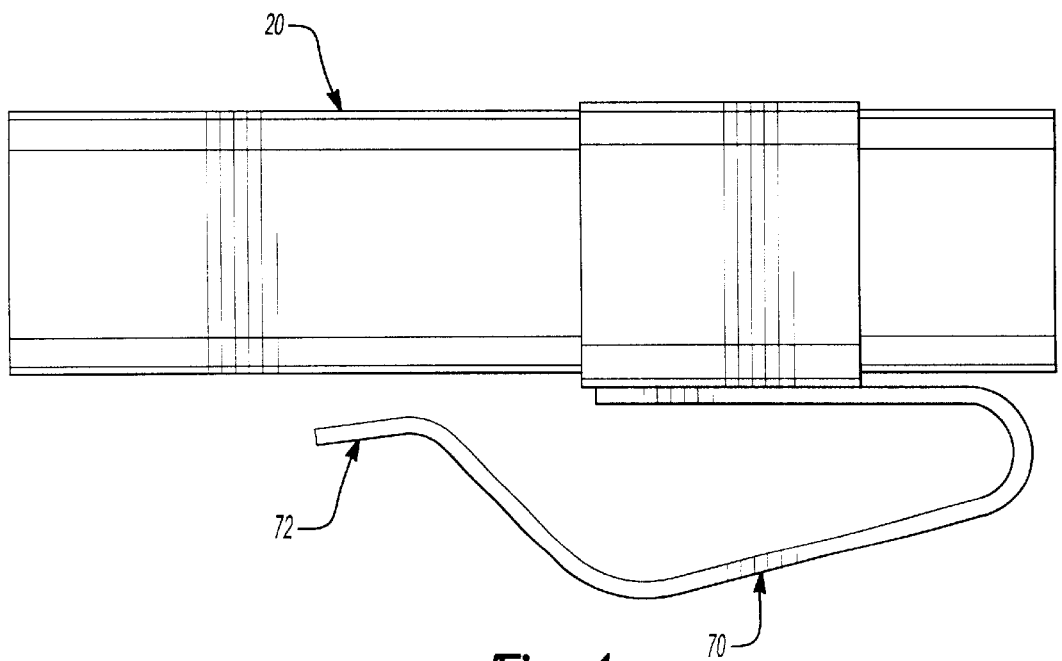
FIG. 4 shows a side view of a clip attached to a fuel rail damper.

FIG. 4 shows a side view of a damping assembly 20 and an alternate design of the finger 70. Note in this design how the finger 70 has a flat surface 72 at its end which is formed to slide along the surface of the damper. This is to allow the finger to slide along the damper and not tend to catch or plastically deform.

Figure 5:
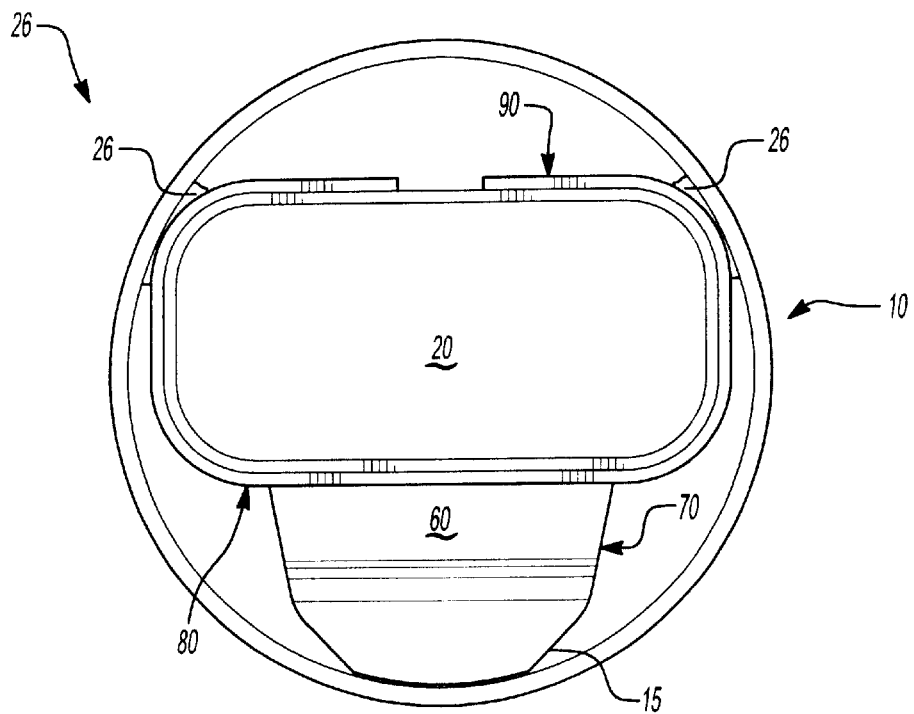
FIG. 5 shows an end view of a fuel damper assembly installed into a fuel rail.

FIG. 5 shows an end view of the damping assembly 20 installed into a fuel rail 10. The finger 70 is forced into contact with the inner surface of the fuel rail 10 opposite of where the finger 70 is in contact with the inner surface of the fuel rail 10. Note how the finger 70 at the bottom of the view rests against the inner surface of the fuel rail 10, while forcing the opposite end of the damping assembly 90 against the inner surface of the fuel rail 10. Note also in this view how the surface of the finger 70 that touches the inner surface of the fuel rail 10 conforms to the radius of the inner surface of the fuel rail 10. Finally, note in this figure how the clip 60 encircles a portion of the damping assembly 20 in order to attach the clip 60 to the damping assembly 20. FIG. 5 also shows a weldments or adhesive material 26 added to the damping assembly 20 in order to fix the damping assembly 20 within the fuel rail 10 either radially or longitudinally. FIG. 5 also shows an indentation 15 in the fuel rail 10, which interacts with the finger 70 to locate the damping assembly 20 within the fuel rail 10. The indentation 15 may take the form of a rib, a bump, a ridge or a notch either formed to extend into the inner diameter of the fuel rail 10 or formed to extend beyond the outer diameter of the fuel rail 10.

The finger or fingers 70 may be designed so that they are plastically deformed to contact the inner surface of the fuel rail 10 once the damper assembly 20 is inserted into the fuel rail 10. Plastic deformation may be desirable if the tolerances of the system do not allow accurate production of a spring clip which will only deform elastically.

Figure 6:
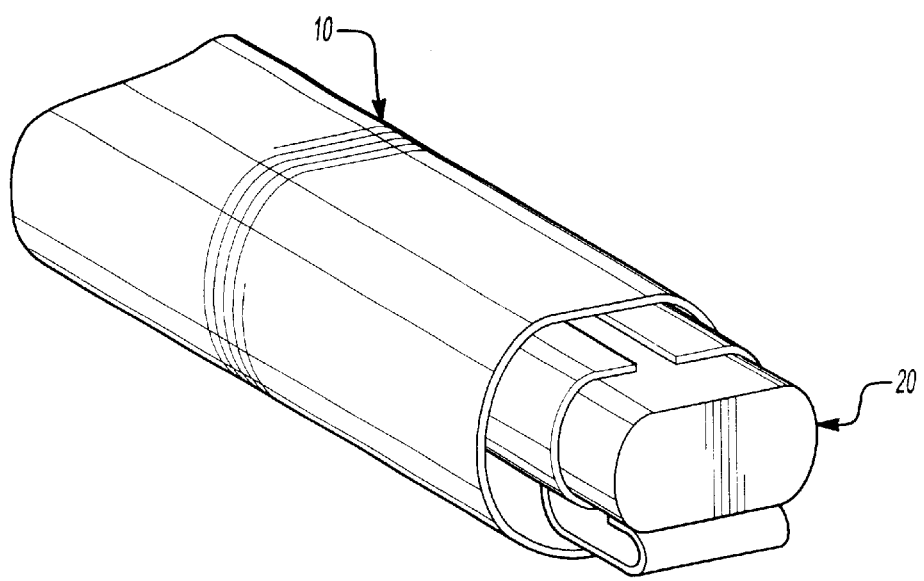
FIG. 6 shows a perspective view of a fuel rail damper assembly being installed into a fuel rail.

FIG. 6 shows the installation method of inserting a damping assembly 20 into a fuel rail 10. The design of the clip 60 may require that the finger 70 is depressed toward the damping assembly 20 in order to insert both the clip 60 and the damping assembly 20 into the fuel rail 10.

Figure 7:
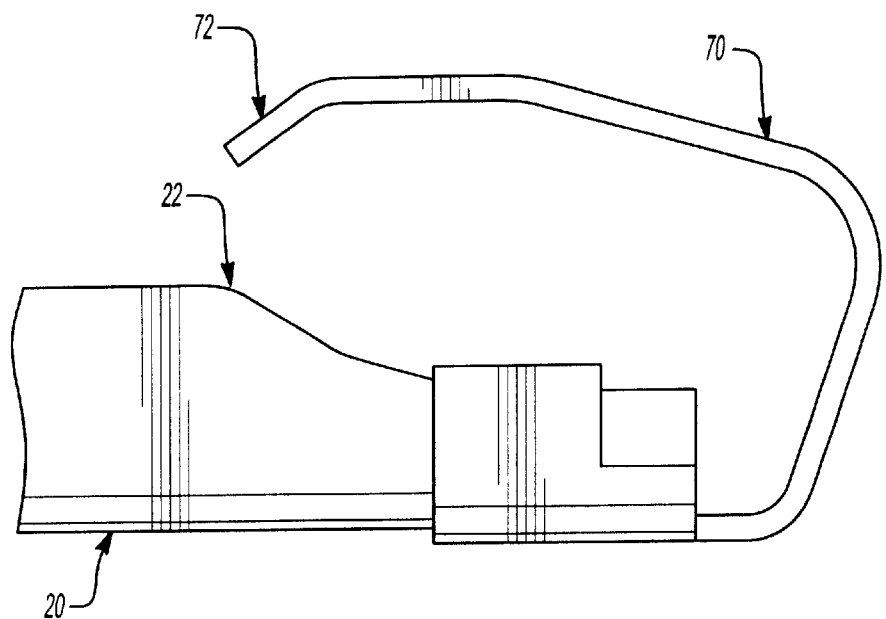
FIG. 7 shows a side view of an alternative clip finger configuration.

FIG. 7 shows an alternative design of the finger 70, incorporating a flat surface 72, to limit the travel of the finger 70. In this case, the flat surface 72 interacts with a feature 22 on the damping assembly 20 to stop the travel of the end of the finger 70.

Figure 8:
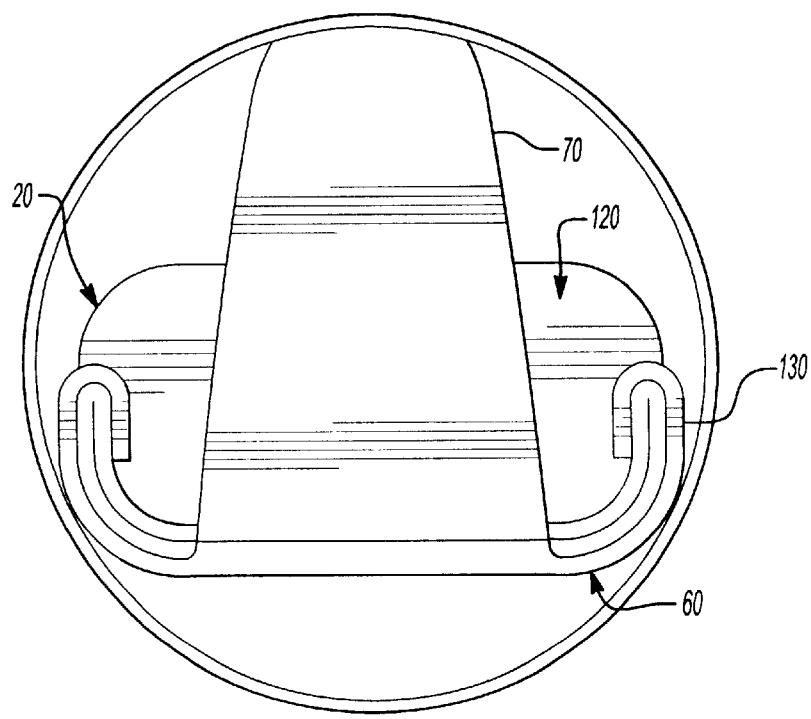
FIG. 8 shows an end view of a clip attached to a damper chamber that has a U-shaped channel formed by a crimp at its end. This clip wraps substantially around the U-shaped channel to attach to the damper chamber.

FIG. 8 shows an end view of an alternative design of the clip 60 and finger 70. Note how the clip 60 has arms 120 which wrap around features 130 of the end of the damping assembly 20. In this illustration the features 130 are crimps which also serve to seal the damping assembly 20.

Figure 9:
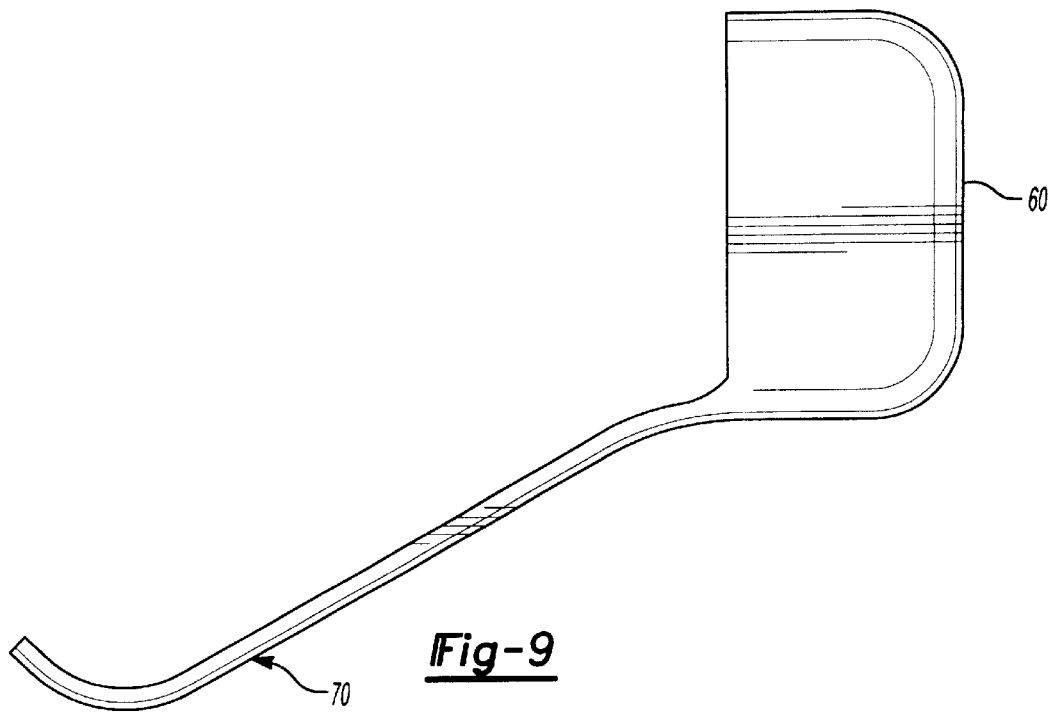
FIG. 9 shows a side view of a clip designed to cover the end of a damper chamber.

FIG. 9 shows a side view of an alternative design of the clip 60 which is designed to fit over an end of a damping assembly.

Figure 10:
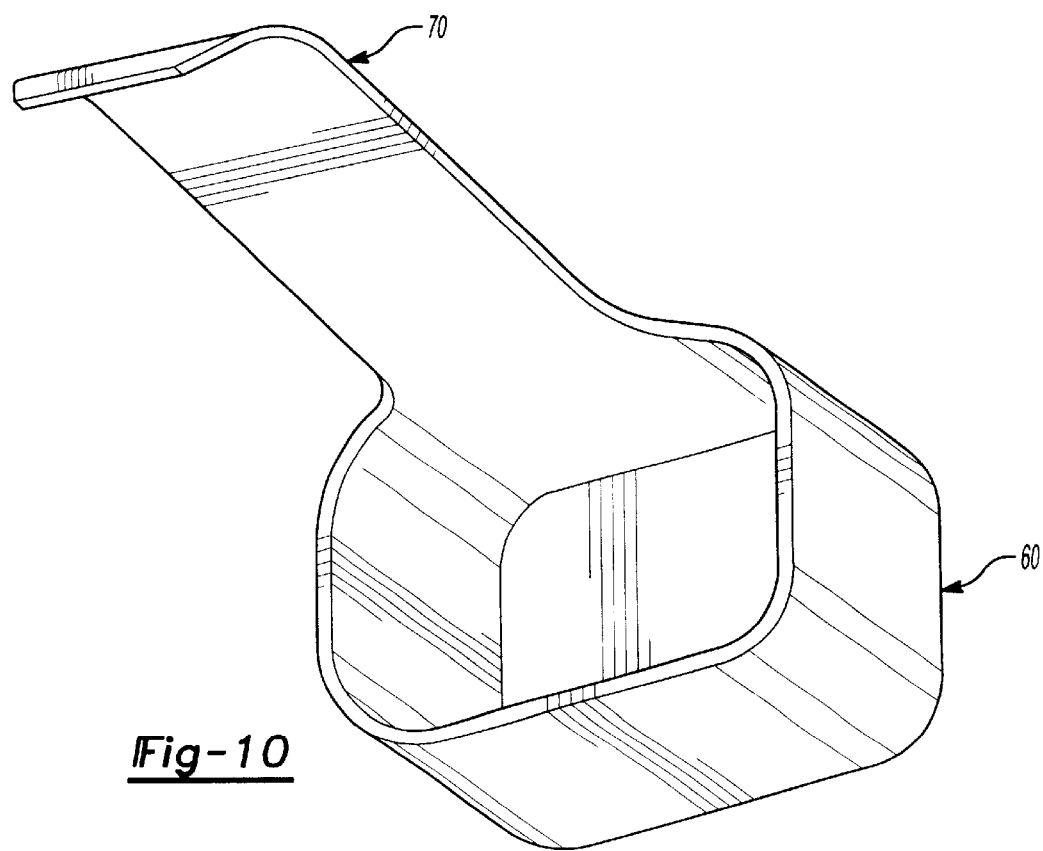
FIG. 10 shows a perspective view of the same clip as shown in FIG. 9.

FIG. 10 shows a perspective view of a clip 60 which is deigned to fit over an end of a damping assembly 20. Clip 60, may be snap fit, adhesively attached, or welded in place.

Figure 11:
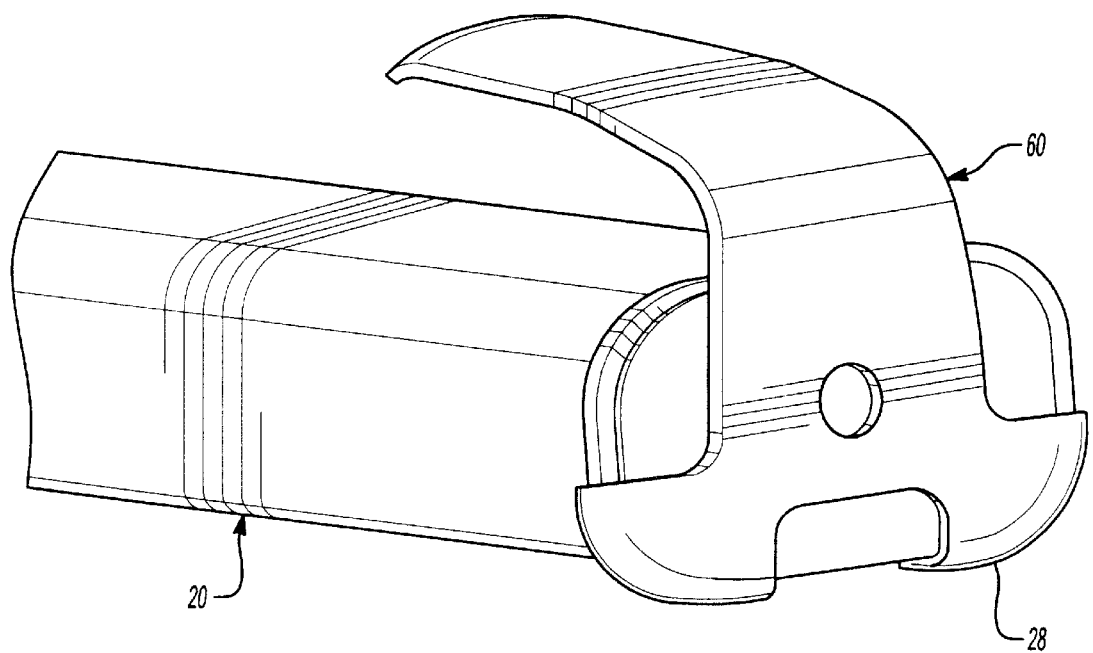
FIG. 11 shows a perspective view of a clip which is attached to a flat end on a damper chamber.

FIG. 11 shows a perspective view of a clip 60 attached to the flat end of a damping assembly 20. FIG. 11 also shows one way of attaching the clip 60 to the damping assembly 20 with a rivet 28.

Various other modifications to the present invention may occur to those skilled in the art to which the present invention pertains. For example, fingers may be made of spring steel, plain carbon steel, other metals and even plastics. Additionally, fingers may be plastically deformed once inserted into the fuel rail in order to come into contact with the fuel rail. Other modifications not explicitly mentioned herein are also possible and within the scope of the present invention. It is the following claims, including all equivalents, which define the scope of the present invention.

What is claimed is:

1. A fuel rail assembly comprising:
   a fuel rail, having an inner surface;
   a damper, said damper contained within said fuel rail, having a first end, a second end, and an intermediate hollow member, wherein said first end and said second end each are formed by crimping said hollow member in a manner such that a cross-sectional outline of each of said first end and said second end does not extend beyond a cross-sectional outline of said hollow member; and
   at least one clip fixed in relation to one of said first end or said second end, said at least one clip having at least one finger, wherein said at least one finger contacts said inner wall of said fuel rail, further wherein said at least one finger is spaced from a first radial side of said damper, further wherein a second radial side of said damper is in contact with said inner surface of said fuel rail.

2. A fuel rail assembly according to claim 1, wherein said at least one finger is shaped to substantially conform to said inner surface of said fuel rail.

3. A fuel rail assembly according to claim 1, wherein said at least one clip has a mounting structure, further wherein said mounting structure substantially radially encompasses said first end or said second end so as to fixedly attach said at least one clip thereto.

4. A fuel rail assembly according to claim 1 wherein said at least one clip is welded to said one of said first end or said second end.

5. A fuel rail assembly according to claim 1 wherein said at least one clip is attached with adhesive to said one of said first end or said second end.

6. A fuel rail assembly according to claim 1 wherein said at least one clip is crimped to said one of said first end or said second end.

7. A fuel rail assembly according to claim 1 wherein said at least one clip is riveted to said one of said first end or said second end.

8. A fuel rail assembly according to claim 1 further comprising at least one indentation on the inner surface of said fuel rail, further wherein at least one said finger is cooperatively engaged with said at least one indentation so as to fix said fuel damper assembly with respect to said fuel rail.

9. A fuel rail assembly according to claim 1 further wherein at least one finger is fixedly attached to the inner surface of said fuel rail with adhesive.

10. A fuel rail damping assembly for a fuel rail with an inner surface, comprising a damping chamber, said damping chamber having a first end, a second end, and an intermediate hollow member, wherein said first end and said second end each are formed by crimping said hollow member in a manner such that the cross-sectional outline of each of said firs end and said second end do not extend beyond the cross-sectional outline of said hollow member, said damping assembly further comprising a first clip and a second clip fixedly attached to each of said first end and said second end, said first clip and said second clip each having a first finger and a second finger respectively, further wherein said first finger and said second finger are disposed on a same radial side of said damping assembly, further wherein said first finger and said second finger are adapted to press an opposite radial side of said damping assembly against said inner surface of said fuel rail.

11. A method for mounting a fuel pressure damper within a fuel rail comprising the steps of:

providing a fuel rail, a fuel pressure damper assembly, and at least one clip, said at least one clip further comprising at least on finger extending from a first side of said fuel rail damper assembly;

inserting said fuel rail damper assembly inside said fuel rail such that said at least one finger clip comes in contact with the interior surface of said fuel rail and further wherein the interior surface of said fuel rail comes in contact with a second side of said fuel rail damper assembly; and fixedly attaching said finger to said inner surface of said fuel rail with adhesive.

12. A method for mounting a fuel pressure damper within a fuel rail comprising the steps of:

providing a fuel rail, a fuel pressure damper assembly, and at least one clip, said at least one clip further comprising at least on finger extending from a first side of said fuel rail damper assembly;

inserting said fuel rail damper assembly inside said fuel rail such that said at least one finger clip comes in contact with the interior surface of said fuel rail and further wherein the interior surface of said fuel rail comes in contact with a second side of said fuel rail damper assembly; and indenting said fuel rail in the vicinity of at least one finger.

13. A method for mounting a fuel pressure damper within a fuel rail comprising the steps of:

providing a fuel rail, a fuel pressure damper assembly, and at least one clip, said at least one clip further comprising at least on finger extending from a first side of said fuel rail damper assembly;

inserting said fuel rail damper assembly inside said fuel rail such that said at least one finger clip comes in contact with the interior surface of said fuel rail and further wherein the interior surface of said fuel rail comes in contact with a second side of said fuel rail damper assembly; and plastically deforming at least one of said fingers while inside said fuel rail.

14. A method for mounting a fuel pressure damper within a fuel rail comprising the steps of:

providing a fuel rail, a fuel pressure damper assembly, and at least one clip, said at least one clip further comprising at least on finger extending from a first side of said fuel rail damper assembly, and;

inserting said fuel rail damper assembly inside said fuel rail such that said at least one finger clip comes in contact with the interior surface of said fuel rail and further wherein the interior surface of said fuel rail comes in contact with a second side of said fuel rail damper assembly;

wherein said fuel rail has at least one indentation on the inner surface of said fuel rail, further wherein at least one of said fingers is capable of cooperatively engaging said at least one indentation to fix said fuel rail damper assembly with respect to said fuel rail and further comprising the step of inserting said fuel rail damper assembly into said fuel rail until said at least one finger cooperatively engages said at least on indentation.

* * * * *